United States Patent
Li et al.

(10) Patent No.: US 11,799,508 B2
(45) Date of Patent: Oct. 24, 2023

(54) WAVE LIMITING CIRCUIT, AND PRE-CALIBRATION METHOD, DYNAMIC CORRECTION METHOD, AND APPARATUSES THEREFOR

(71) Applicant: XI'AN ZHONGXING NEW SOFTWARE CO., LTD., Shaanxi (CN)

(72) Inventors: Yuanyong Li, Guangdong (CN); Shougang Cheng, Guangdong (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 17/620,111

(22) PCT Filed: May 14, 2020

(86) PCT No.: PCT/CN2020/090128
§ 371 (c)(1),
(2) Date: Dec. 16, 2021

(87) PCT Pub. No.: WO2021/027351
PCT Pub. Date: Feb. 18, 2021

(65) Prior Publication Data
US 2022/0321160 A1 Oct. 6, 2022

(30) Foreign Application Priority Data
Aug. 13, 2019 (CN) .......................... 201910745728.X

(51) Int. Cl.
*H04B 14/06* (2006.01)
*H04B 1/40* (2015.01)
(Continued)

(52) U.S. Cl.
CPC ............... *H04B 1/40* (2013.01); *H04B 1/163* (2013.01); *H04B 17/11* (2015.01); *H04B 17/21* (2015.01); *H04B 17/318* (2015.01)

(58) Field of Classification Search
CPC .......... H04B 1/40; H04B 1/0458; H04B 1/18; H03H 7/38; H03H 3/0077
See application file for complete search history.

(56) References Cited

U.S. PATENT DOCUMENTS 9,178,498 B2 * 11/2015 Chong ................. H03K 3/0322
2012/0214421 A1 8/2012 Hoirup et al.
(Continued)

FOREIGN PATENT DOCUMENTS

| CN | 109274347 A | 1/2019 |
| CN | 109660267 A | 4/2019 |

OTHER PUBLICATIONS

International search report of PCT Patent Application No. PCT/CN2020/090128 dated Aug. 13, 2020.
(Continued)

*Primary Examiner* — Tuan Pham

(57) ABSTRACT

The present application relates to a wave limiting circuit, and a pre-calibration method, a dynamic correction method and apparatuses therefor. The circuit comprises: an LC series resonance circuit, a controller and a matching element, wherein a first end of the matching element is connected to a radio frequency circuit; a second end thereof is connected to an antenna, and a third end thereof is connected to one end of the LC series resonance circuit; and the other end of the LC series resonance circuit is connected to the controller so as to adjust parameters of the LC series resonance circuit by means of the controller.

4 Claims, 2 Drawing Sheets

(51) Int. Cl.
    *H04B 17/11*     (2015.01)
    *H04B 17/21*     (2015.01)
    *H04B 17/318*     (2015.01)
    *H04B 1/16*     (2006.01)

(56) References Cited

U.S. PATENT DOCUMENTS

2015/0349834 A1* 12/2015 Chakraborty ............ H04B 1/40
                                                                                                           455/75
2017/0126197 A1*   5/2017 Fritz ...................... H03H 7/175

OTHER PUBLICATIONS

Supplementary European Search Report of European Patent Application No. 20852010.6 dated May 11, 2023.

\* cited by examiner

WAVE LIMITING CIRCUIT, AND PRE-CALIBRATION METHOD, DYNAMIC CORRECTION METHOD, AND APPARATUSES THEREFOR

CROSS-REFERENCE TO RELATED APPLICATION

The present disclosure claims the priority of Chinese patent application No. 201910745728.X, filed on Aug. 13, 2019 and entitled "Wave Limiting Circuit, and Pre-calibration Method, Dynamic Correction Method, and Apparatuses therefor", which is incorporated herein by reference in its entirety.

FIELD OF THE INVENTION

The present disclosure relates to the technical field of communications, and in particular to a wave limiting circuit, as well as a pre-calibration method, a pre-calibration apparatus, a dynamic correction method and a dynamic correction apparatus.

BACKGROUND OF THE INVENTION

In order to meet requirements of different operators, most mobile terminals would be manufactured as multimode-multiband all-network mobile phones. For a 5G multimode terminal, in particular for a 5G terminal that supports non-standalone (NSA), in enhanced network dual connection (ENDC, LTE-NR connection), when long term evolution (LTE, 4G technology) and new radio (NR) are applied to perform synchronous transmission and reception, an LTE transmission signal harmonic at a relatively low frequency would fall within an NR band, such as an n78 band, an n79 band, etc., which could result in a significant impact.

In some cases, by increasing isolation between antennas, band-pass filters are used to suppress harmonics. However, such a solution for improving antenna isolation might become difficult to implement due to high-density antenna distribution. The band-pass filter is able to suppress a harmonic, but has not entered into widespread use because of its high costs and bulky design.

It is therefore desirable to provide a wave limiting circuit, as well as a pre-calibration method, a dynamic correction method and corresponding apparatuses therefor to overcome the disadvantages of existing technologies.

SUMMARY OF THE INVENTION

In order to solve the above problem, the present disclosure provides a wave limiting circuit, as well as a pre-calibration method, a pre-calibration apparatus, a dynamic correction method and a dynamic correction apparatus.

In accordance with an aspect of the present disclosure, a wave limiting circuit includes an LC series resonance circuit, a controller and a matching element. The matching element has a first end connected to a radio frequency circuit, a second end connected to an antenna, and a third end connected to one end of the LC series resonance circuit. The other end of the LC series resonance circuit is connected to the controller, such that a parameter of the LC series resonance circuit is adjusted via the controller.

In accordance with another aspect of the present disclosure, a pre-calibration method includes steps of acquiring an operating frequency of LTE, applying a continuous wave signal with the same frequency as the operating frequency to a port of an antenna, acquiring a signal strength indication level of a radio frequency circuit when the radio frequency circuit receives the continuous wave signal, and controlling a parameter of an LC series resonance circuit via a controller, so that the signal strength indication level of the radio frequency circuit reaches a preset level strength.

In accordance with still another aspect of the present disclosure, a dynamic correction method includes steps of acquiring an operating frequency of LTE, and adjusting a parameter of an LC series resonance circuit according to the operating frequency of LTE via a controller, so that a signal strength indication level of a radio frequency circuit reaches a preset level strength.

In accordance with yet another aspect of the present disclosure, a pre-calibration apparatus includes a first acquisition module configured to acquire an operating frequency of LTE, an addition module configured to apply a continuous wave signal with the same frequency as the operating frequency to a port of an antenna, a second acquisition module configured to acquire a signal strength indication level of a radio frequency circuit when the radio frequency circuit receives the continuous wave signal, and a first control module configured to control a parameter of an LC series resonance circuit via a controller, so that the signal strength indication level of the radio frequency circuit reaches a preset level strength.

In accordance with still yet another aspect of the present disclosure, a dynamic correction apparatus includes a third acquisition module configured to acquire an operating frequency of LTE, and a second control module configured to adjust a parameter of an LC series resonance circuit according to the operating frequency of LTE via a controller, so that a signal strength indication level of a radio frequency circuit reaches a preset level strength.

DETAILED DESCRIPTION OF THE EMBODIMENTS

In order to make the objectives, technical solutions and advantages of the present disclosure clearer, the technical solutions in the embodiments of the present disclosure will be further described in details in conjunction with the accompanying figures showing exemplary embodiments of the disclosure. Obviously, the described embodiments are only part of the embodiments of the present invention, rather than all of the embodiments thereof. All other embodiments obtained based on embodiments in the present disclosure by those of ordinary skill in the art without any creative effort fall within the scope of the present disclosure.

Figure 1:
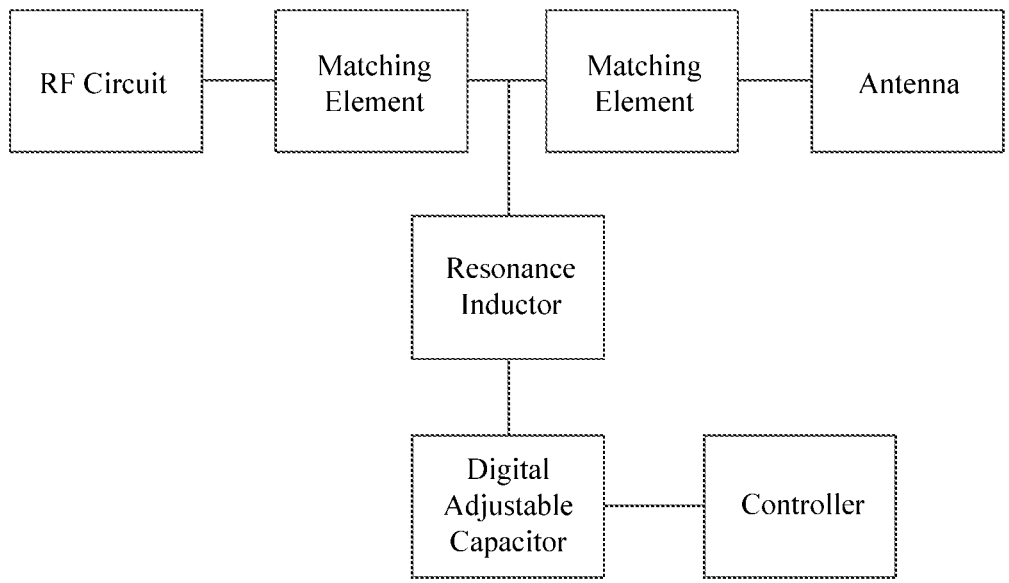
FIG. 1 is a schematic diagram of a wave limiting circuit according to an embodiment of the present disclosure.

FIG. 1 illustrates a wave limiting circuit, which includes an LC series resonance circuit, a controller and a matching element.

The matching element has a first end connected to a radio frequency circuit, a second end connected to an antenna, and a third end connected to one end of the LC series resonance circuit. The other end of the LC series resonance circuit is connected to the controller, and a parameter of the LC series resonance circuit is adjusted via the controller.

In embodiments of the present disclosure, a wave limiting circuit includes an LC series resonance circuit, a controller and a matching element, the matching element is connected to a radio frequency circuit, an antenna and the LC series resonance circuit, respectively, and a parameter of the LC series resonance circuit is adjusted via the controller. By utilizing the above solution, the parameter of the LC series resonance circuit can be adjusted via the controller, such that a wave limiting frequency can be adjusted following an LTE frequency, thereby achieving full-coverage wave limitation for an LTE interference source.

In an implementation, the LC series resonance circuit includes a resonance inductor and a digital adjustable capacitor. The LC series resonance circuit can realize narrow-band wave limitation at a single point in time.

The resonance inductor has one end connected to the matching element, and the other end connected to a first end of the digital adjustable capacitor. The digital adjustable capacitor also has a second end connected to the controller and a third end grounded.

In an implementation, when an operating frequency of LTE is adjusted, a controller is configured to adjust a value of the adjustable capacitor via a serial interface or an analog interface, such that the wave limiting frequency is adjusted following an LTE frequency, thereby finally achieving full-coverage wave limitation for an LTE interference source.

The matching element is an electronic device that enables the matching between the radio frequency circuit and the antenna, which electronic device may be an inductor, a capacitor, etc., or may be other devices.

In embodiments of the present disclosure, the radio frequency circuit may be a 4G radio frequency circuit, may also be a 5G radio frequency circuit, or may further be an LTE-NR dual connection radio frequency circuit (4G+5G dual connection).

Figure 2:
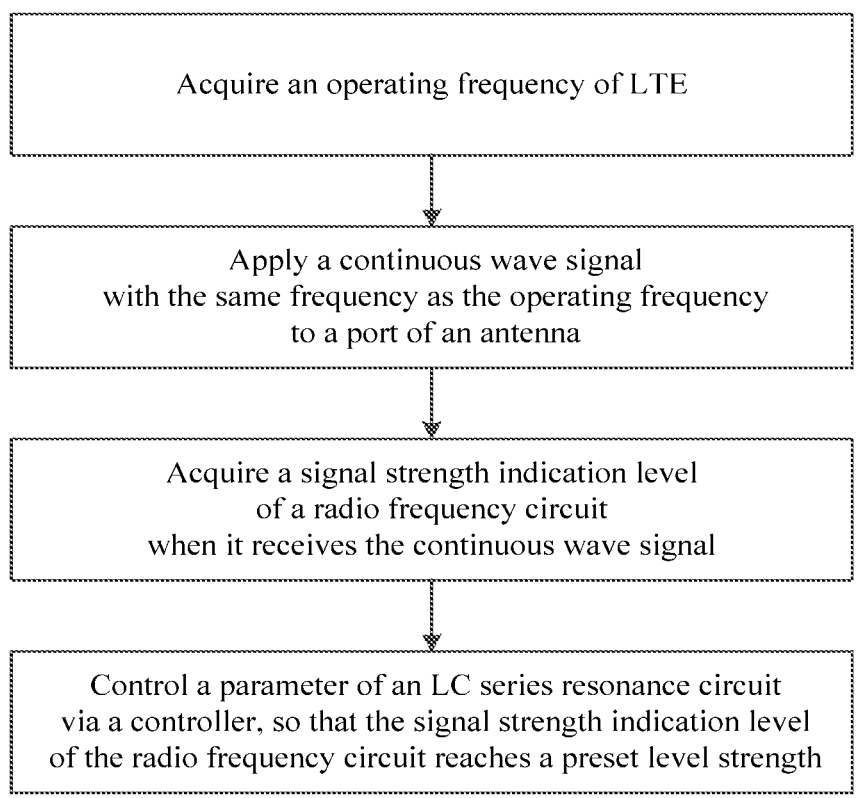
FIG. 2 is a flowchart of a pre-calibration method for a wave limiting circuit according to an embodiment of the present disclosure.

On the basis of a similar concept, the disclosure also provides a pre-calibration method for a wave limiting circuit, as shown in FIG. 2, which may be applied to any wave limiting circuit mentioned above. In the method, an operating frequency of LTE is acquired; a continuous wave signal with the same frequency as the operating frequency is applied to a port of an antenna; a signal strength indication level of a radio frequency circuit is acquired when the radio frequency circuit receives the continuous wave signal; and a parameter of an LC series resonance circuit is controlled via a controller, so that the signal strength indication level of the radio frequency circuit reaches a preset level strength.

In an implementation, in the step of controlling the parameter of the LC series resonance circuit via the controller, a value of the digital adjustable capacitor in the LC series resonance circuit is recorded, and the operating frequency of LTE is recorded.

In an implementation, the radio frequency circuit may be a 4G radio frequency circuit, may also be a 5G radio frequency circuit, or may further be an LTE-NR dual connection radio frequency circuit (4G+5G dual connection).

In principle, it is to be understood that before the delivery of a mobile phone, a continuous wave (CW) signal with the same frequency as the operating frequency as that of LET may be applied to a port of an antenna, an RSSI level of an NR receiver at an interference frequency may be synchronously read, a value of an adjustable capacitor may be adjusted by a controller until the RSSI level of the NR receiver is the lowest, and at this time, the value of the adjustable capacitor and the operating frequency of LTE may be recorded.

A correlation between a certain number of LTE frequencies and a certain number of values of the adjustable capacitor is acquired by repeating the above method. The recorded values of the adjustable capacitor and the operating frequency of LTE are recorded in one table according to the correlation. When the mobile phone works in an ENDC mode, the value of the adjustable capacitor corresponding to the operating frequency of LTE is called, such that wave limitation for an interference can be realized quickly and accurately.

On the basis of a similar concept, the present disclosure also provides a pre-calibration apparatus for a wave limiting circuit, which may include a first acquisition module, an addition module, a second acquisition module and a first control module. The first acquisition module is configured to acquire an operating frequency of LTE. The addition module is configured to apply a continuous wave signal with the same frequency as the operating frequency to a port of an antenna. The second acquisition module is configured to acquire a signal strength indication level of a radio frequency circuit when the radio frequency circuit receives the continuous wave signal. The first control module is configured to control a parameter of an LC series resonance circuit via a controller, so that the signal strength indication level of the radio frequency circuit reaches a preset level strength.

In an implementation, the first control module comprises a first recording sub-module configured to record a value of a digital adjustable capacitor in the LC series resonance circuit, and a second recording sub-module configured to record the operating frequency of LTE.

Figure 3:
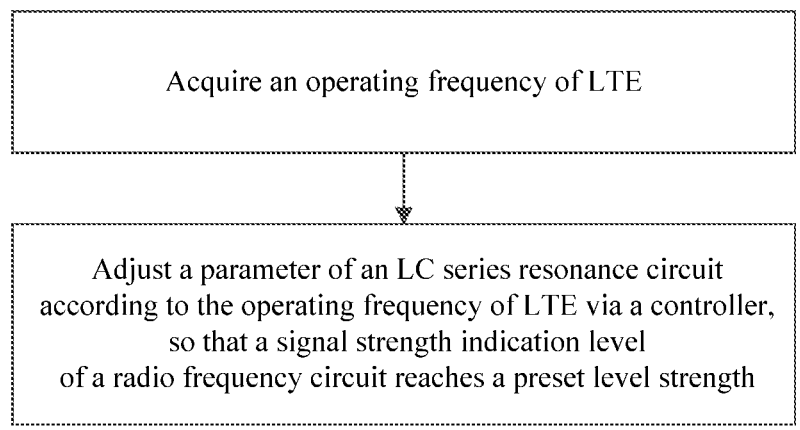
FIG. 3 is a flowchart of a dynamic correction method for a wave limiting circuit according to an embodiment of the present disclosure.

On the basis of a similar concept, the present disclosure also provides a dynamic correction method for a wave limiting circuit, as shown in FIG. 3, which may be applied to any wave limiting circuit mentioned above. In the method, an operating frequency of LTE is acquired; and according to the operating frequency of LTE, a parameter of an LC series resonance circuit is adjusted via a controller, so that a signal strength indication level of a radio frequency circuit reaches a preset level strength.

In an implementation, in the step of adjusting the parameter of the LC series resonance circuit according to the operating frequency of LTE via the controller, according to the operating frequency of LTE and a value of a resonance inductor in the LC series resonance circuit, a value of a digital adjustable capacitor in the LC series resonance circuit is determined; and the value of the digital adjustable capacitor is adjusted via the controller.

In an implementation, the radio frequency circuit may be a 4G radio frequency circuit, may also be a 5G radio frequency circuit, or may further be an LTE-NR dual connection radio frequency circuit (4G+5G dual connection).

In principle, it is to be understood that when an ENDC connection is established, a mobile phone may deduce an operating value of an adjustable capacitor according to an operating frequency of LTE and a value of a patch L; a controller may set the value of the adjustable capacitor, and may slightly adjust a value range of the digital adjustable capacitor according to a range of the value error between a resonance inductor device and the digital adjustable capacitor until RSSI read by an NR receiver is the lowest. The solution can also accurately correct deflection of an LTE uplink allocation RB from a central frequency.

On the basis of a similar concept, the present disclosure also provides a dynamic correction apparatus. The apparatus may include a third acquisition module configured to acquire an operating frequency of LTE, and a second control module configured to adjust a parameter of an LC series resonance circuit according to the operating frequency of LTE via a controller, so that a signal strength indication level of a radio frequency circuit reaches a preset level strength.

In an implementation, the second control module includes a determining sub-module configured to determine a value of a digital adjustable capacitor in the LC series resonance circuit according to the operating frequency of LTE and a value of a resonance inductor in the LC series resonance circuit; and an adjusting sub-module configured to adjust the value of the digital adjustable capacitor via the controller.

Several terms herein are explained as follows:

ENDC Enhanced Network Dual Connection, LTE-NR Dual Connection;

LTE: Long Term Evolution, 4G technology;

NR: New Radio;

RB: Resource Block; and

RSSI: Received Signal Strength Indication.

It should be noted that relational terms such as "first" and "second" herein are used solely to distinguish one from another entity or operation, without necessarily requiring or implying any such actual relationship or order between such entities or operations.

It can be understood that the embodiments described herein may be implemented in hardware, software, firmware, middleware, microcode, or a combination thereof. For hardware implementations, a processing unit may be implemented in one or more application specific integrated circuits (ASICs), a digital signal processor (DSP), a DSP device (DSPD), a programmable logic device (PLD), a field-programmable gate array (FPGA), a general-purpose processor, a controller, a microcontroller, a microprocessor, other electronic units for performing the functions described herein, or a combination thereof.

For software implementations, the technology described herein may be implemented via those units for performing the functions described herein. Software code may be stored in the memory and executed by the processor. The memory may be implemented in the processor or external to the processor.

Those of ordinary skills in the art will appreciate that the units and algorithm steps of various examples described in conjunction with the embodiments disclosed herein may be implemented in electronic hardware or a combination of computer software and electronic hardware. Whether these functions are executed in hardware or software depends on the specific application and design constraints of the technical solution. Professionals and technicians can use different methods for each specific application to implement the described functions, but such implementation should not be considered to be beyond the disclosed scope.

In embodiments provided herein, it should be understood that the disclosed apparatuses and methods may be implemented in other ways. For example, the apparatus embodiments described above are merely illustrative. For example, the division of units is merely a logical functional division, and there may be other divisions in actual implementations. For example, a plurality of units or components may be combined or integrated into another system, or some features may be omitted or not implemented. In addition, the mutual couplings or direct couplings or communicative connections illustrated or discussed may be indirect couplings or communicative connections via some interfaces, devices or units, and may be electrical, mechanical or in other forms.

Moreover, various functional units in various embodiments of the present disclosure may be integrated into one processing unit, or various units may be physically present separately, or two or more units may be integrated into one unit.

The functions, if implemented in the form of a software functional unit and marketed or used as an independent product, may be stored in a computer-readable storage medium. Based on such understanding, the technical solutions of embodiments of the present disclosure, in essence, or its contribution to the prior art, or part of the technical solution may be embodied in the form of a software product. The computer software product is stored in a storage medium, and includes a plurality of instructions used to cause a computer device (which may be a personal computer, a server, or a network device, etc.) to perform all or some of the steps of the method in various embodiments of the present disclosure. The foregoing storage medium includes a variety of mediums that may store program codes, such as a USB flash disk, a mobile hard disk, an ROM, an RAM, a magnetic disk, or an optical disk.

Compared with existing techniques, in some cases, the technical solution of the present disclosure can provide the following advantages: the disclosed wave limiting circuit includes an LC series resonance circuit, a controller and a matching element, the matching element is connected to a radio frequency circuit, an antenna and the LC series resonance circuit, respectively, and a parameter of the LC series resonance circuit is adjusted via the controller. By utilizing the above solution, the parameter of the LC series resonance circuit can be adjusted via the controller, such that a wave limiting frequency can be adjusted following an LTE frequency, thereby achieving full-coverage wave limitation for an LTE interference source.

The terms "include", "including", or any other variation thereof, are intended to cover a non-exclusive inclusion, such that a process, a method, an article, or an apparatus that includes a series of elements not only includes those elements but also may include other elements not expressly listed or inherent to such process, method, article, or apparatus. An element preceded by "includes a . . . " does not, without more constraints, preclude the existence of additional identical elements in the process, method, article, or apparatus that includes the element.

It should be noted that the above embodiments are merely intended for illustration of the technical solutions of the present disclosure, but not for limitation thereof. Although the present disclosure is described in detail with reference to the foregoing embodiments, those of ordinary skills in the art should understand that they may still make modifications to the technical solutions described in the foregoing embodiments or make equivalent replacements to some technical features thereof. The modifications or replacements should not cause the essence of corresponding technical solutions to depart from the spirit and scope of the technical solutions of the embodiments of the present disclosure.

What is claimed is:

1. A wave limiting circuit, comprising: an LC series resonance circuit, a controller and a matching element, wherein the matching element has a first end connected to a radio frequency circuit, a second end connected to an antenna, and a third end connected to one end of the LC series resonance circuit; and wherein the other end of the LC series resonance circuit is connected to the controller, so that a parameter of the LC series resonance circuit is adjusted via the controller.

2. The wave limiting circuit of claim 1, wherein the LC series resonance circuit comprises a resonance inductor and a digital adjustable capacitor;
   wherein the resonance inductor has one end connected to the matching element, and the other end connected to a first end of the digital adjustable capacitor; and
   wherein the digital adjustable capacitor has a second end connected to the controller, and a third end grounded.

3. The wave limiting circuit of claim 2, wherein the controller is connected to the digital adjustable capacitor via a serial interface or an analog interface, to control a value of the digital adjustable capacitor.

4. The wave limiting circuit of claim 1, wherein the radio frequency circuit comprises a 4G radio frequency circuit, a 5G radio frequency circuit or an LTE-NR dual connection radio frequency circuit.

\* \* \* \* \*